(12) United States Patent
Krizan

(10) Patent No.: US 10,312,783 B2
(45) Date of Patent: Jun. 4, 2019

(54) VARIABLE FLUX BRIDGE FOR ROTOR AN ELECTRIC MACHINE

(71) Applicant: Ford Global Technologies, LLC, Dearborn, MI (US)

(72) Inventor: Jacob Krizan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 15/602,895

(22) Filed: May 23, 2017

(65) Prior Publication Data

US 2018/0342936 A1 Nov. 29, 2018

(51) Int. Cl.
*H02K 21/02* (2006.01)
*H02K 1/02* (2006.01)
*H02K 1/27* (2006.01)

(52) U.S. Cl.
CPC ............. *H02K 21/028* (2013.01); *H02K 1/02* (2013.01); *H02K 1/276* (2013.01); *H02K 1/2766* (2013.01); *H02K 2213/03* (2013.01)

(58) Field of Classification Search
CPC ........ H02K 1/02; H02K 1/276; H02K 1/2766; H02K 21/021–21/21
See application file for complete search history.

(56) References Cited

U.S. PATENT DOCUMENTS

| 4,339,874 | A | 7/1982 | Mc'Carty et al. |
| 8,269,390 | B2 | 9/2012 | Sakai et al. |
| 9,306,423 | B2 | 4/2016 | Jang et al. |
| 2011/0304235 | A1* | 12/2011 | Hashiba ................... H02K 1/02 310/156.76 |

FOREIGN PATENT DOCUMENTS

CN 201146439 Y 11/2008

* cited by examiner

*Primary Examiner* — Ramon M Barrera
(74) *Attorney, Agent, or Firm* — Brooks Kushman P.C.

(57) ABSTRACT

An electric machine assembly for an electrified vehicle including a stator core, a rotor, a first pair of magnets, a second pair of magnets, and a variable flux magnet is provided. The stator core defines a cavity. The rotor is disposed within the cavity for rotation and includes a bridge. Each of the first pair of magnets may be mounted to the rotor and spaced from one another on either side of a first D-axis. Each of the second pair of magnets may be mounted to the rotor and spaced from one another on either side of a second D-axis. The first D-axis and the second D-axis are spaced from one another on either side of a Q-axis. The variable flux magnet is embedded in the bridge and located on the rotor to influence current associated with the Q-axis to control torque output of the rotor, and to pulse D-axis current to control a magnetization of the bridge.

16 Claims, 9 Drawing Sheets

VARIABLE FLUX BRIDGE FOR ROTOR AN ELECTRIC MACHINE

TECHNICAL FIELD

The present disclosure relates to an electric machine assembly of an electrified vehicle.

BACKGROUND

Extended drive range technology for electrified vehicles, such as battery electric vehicles (BEVs), hybrid electric vehicles (HEVs), and plug in hybrid vehicles (PHEVs), is continuously improving. Achieving these increased ranges, however, often requires traction batteries and electric machines to have higher power outputs and associated thermal management systems with increased capacities in comparison to previous BEVs and PHEVs. Improving efficiency between electric machine stator cores and rotors may increase power outputs of the electric machine.

SUMMARY

An electric machine assembly for an electrified vehicle includes a stator core, a rotor, a first pair of magnets, a second pair of magnets, and a variable flux magnet. The stator core defines a cavity. The rotor is disposed within the cavity for rotation and includes a bridge. Each of the first pair of magnets is mounted to the rotor and spaced from one another on either side of a first D-axis. Each of the second pair of magnets is mounted to the rotor and spaced from one another on either side of a second D-axis. The first D-axis and the second D-axis are spaced from one another on either side of a Q-axis. The variable flux magnet is embedded in the bridge and located on the rotor to influence current associated with the Q-axis to control torque output of the rotor, and to pulse D-axis current to control a magnetization of the bridge. The magnets of the first pair of magnets or the second pair of magnets may be arranged with one another to define an inverted V shape. The assembly may further include a first side flux barrier disposed on a first side of the variable flux magnet and a second side flux barrier disposed on a second side of the variable flux magnet. The side flux barriers may be arranged with the variable flux magnet to prevent vertical current or flux associated with the Q-axis from influencing magnetization of the variable flux magnet. The first side flux barrier and the second side flux barrier may each be located to influence magnetic flux to flow in a substantially horizontal path through the variable flux magnet. The variable flux magnet may be one of AlNiCo, ferrite, and a low energy rare-earth metal. The variable flux magnet may be arranged with the first pair of magnets and the second pair of magnets such that magnetic flux associated with the Q-axis is diverted about the variable flux magnet to control the rotor torque output.

An electric machine assembly for an electrified vehicle includes a stator core, a rotor, a first pair of magnets, a second pair of magnets, and a trapezoidal-shaped variable flux magnet. The stator core defines a cavity. The rotor is disposed within the cavity and includes a bridge. The first pair of magnets are arranged with one another to generate current along a first D-axis when the rotor is rotating and the stator core is activated. The second pair of magnets are arranged with one another to generate current along a second D-axis when the rotor is rotating and the stator core is activated. The trapezoidal-shaped variable flux magnet is embedded in the bridge and arranged with the first and second pairs of magnets such that current associated with a Q-axis bisecting the variable flux magnet travels in a substantially horizontal path through the variable flux magnet. The variable flux magnet includes a first side and a second side. The first side is closer to an outer surface of the rotor and has a shorter length than a length of the second side. The trapezoidal shape of the variable flux magnet may create a first path and a second path thicker than the first path to influence magnetic flux to travel along the substantially horizontal path. The assembly may further include a first side flux barrier and a second side flux barrier each disposed on opposing sides of the variable flux magnet to block or minimize magnetic flux traveling in a substantially vertical flow path.

An electric machine assembly includes a rotor, a variable flux magnet, and first and second magnets. The rotor is disposed within a stator core and includes a bridge. The variable flux magnet is embedded in the bridge. The first and second magnets are arranged to define a D-axis therebetween and to define an inverted slope to focus magnetic flux associated with the D-axis into the variable flux magnet and increase a current effect associated with the D-axis on magnetization of the variable flux magnet. The assembly may further include a tangent axis defined by an outer surface of the rotor and an offset axis spaced parallel from the tangent axis. One of the magnets may define an edge axis and an angle of the edge axis relative to the offset axis may be selected to affect an amount of magnetic flux associated with the D-axis transferred into the variable flux magnet to influence a magnetization of the variable flux magnet. The angle of the edge axis relative to the offset axis may be between twenty-five and thirty-five degrees. The angle of the edge axis relative to the offset axis may be approximately thirty degrees. The first magnet and the second magnet may be arranged with one another to form an inverted V. The assembly may further include a first side flux barrier and a second side flux barrier each disposed on one of opposing sides of the variable flux magnet to retain flux of the variable flux magnet therebetween.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
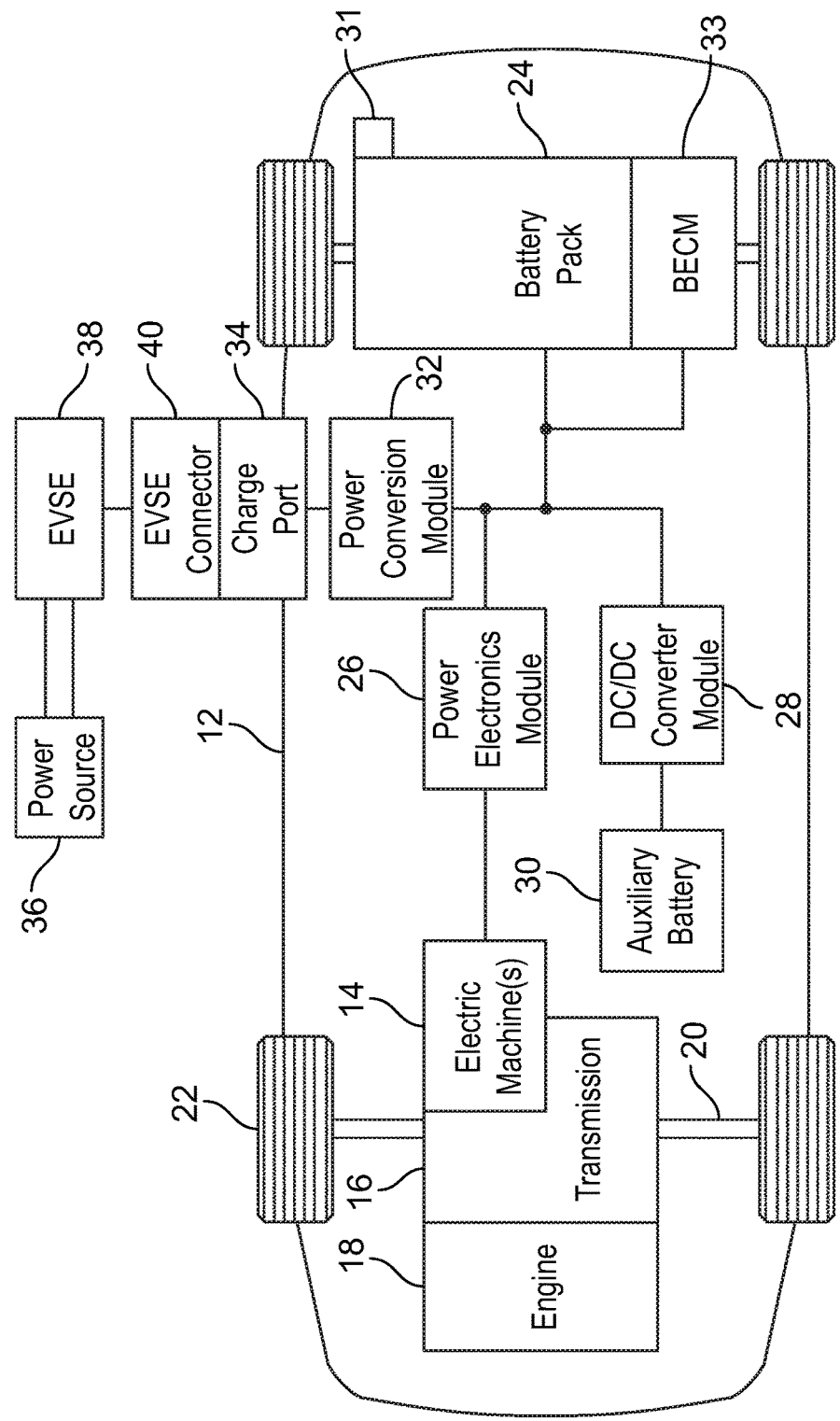
FIG. 1 is a schematic diagram illustrating an example of an electrified vehicle.

FIG. 1 is a schematic diagram illustrating an example of an electrified vehicle. In this example, the electrified vehicle is a PHEV referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

The battery cells of the traction battery 24, such as a prismatic or pouch-type cell, may include electrochemical elements that convert stored chemical energy to electrical energy. Prismatic cells or pouch-type cells may include a housing, a positive electrode (cathode) and a negative electrode (anode). An electrolyte may allow ions to move between the anode and cathode during a discharge operation, and then return during a recharge operation. Terminals may allow current to flow out of the battery cells for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Figure 2:
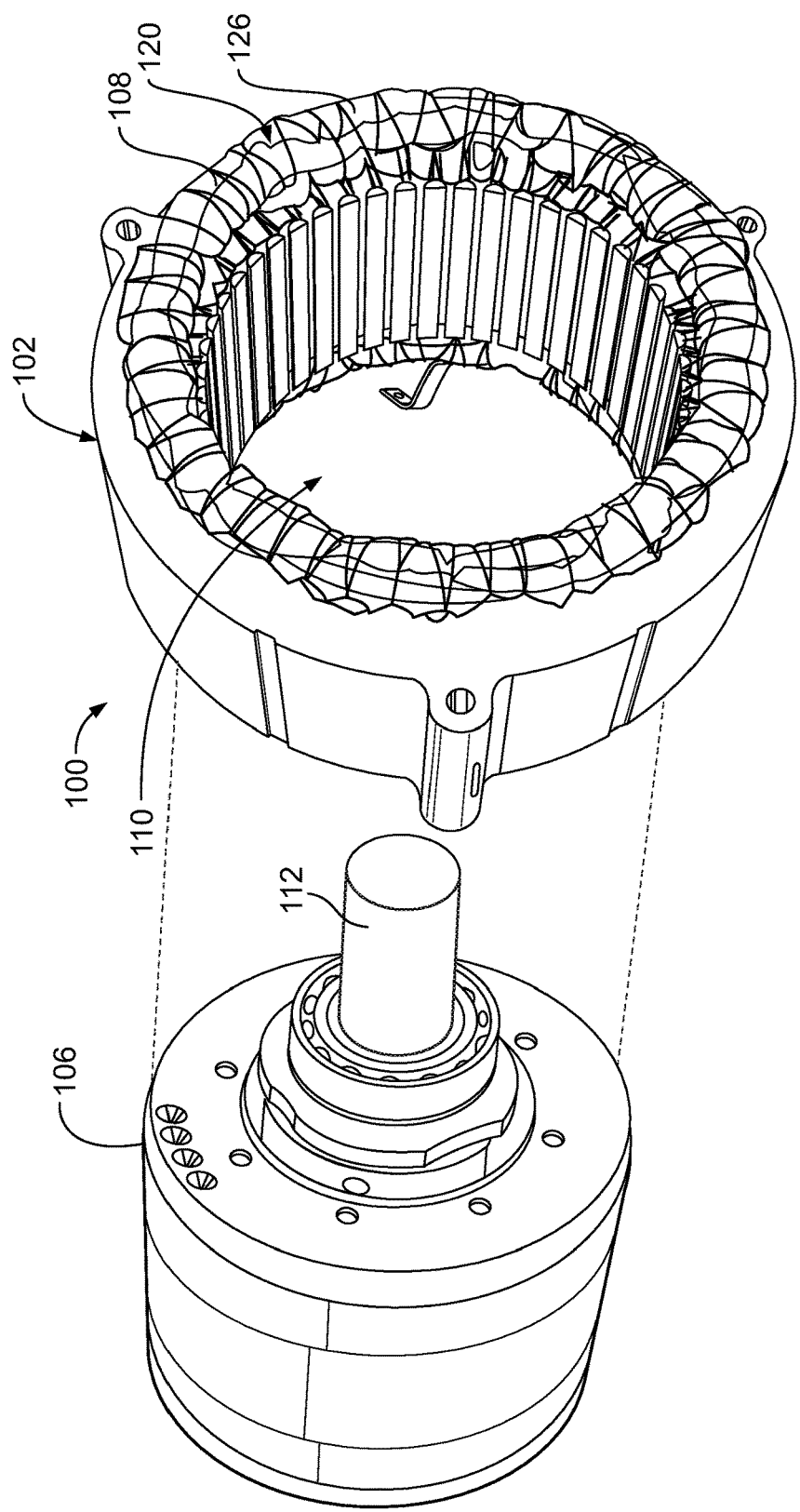
FIG. 2 is a perspective, exploded view of an example of a portion of an electric machine.

FIG. 2 is a partially exploded view illustrating an example of portions of an electric machine for an electrified vehicle, referred to generally as an electric machine 100 herein. The electric machine may include a stator core 102 and a rotor 106. As mentioned above, electrified vehicles may include two electric machines. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. A shaft 112 may be operably connected to the rotor 106 and be coupled to other vehicle components to transfer mechanical power therefrom.

Windings 120 may be disposed within the cavity 110 of the stator core 102. In an electric machine motor example, current may be fed to the windings 120 to obtain a rotational force on the rotor 106. In an electric machine generator example, current generated in the windings 120 by a rotation of the rotor 106 may be used to power vehicle components. Portions of the windings 120, such as end windings 126, may protrude from the cavity 110. During operation of the electric machine 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 generates a rotating magnetic field. Magnets of the rotor 106 will magnetize and rotate with rotating magnetic field to rotate the shaft 112 for mechanical power.

Figure 3:
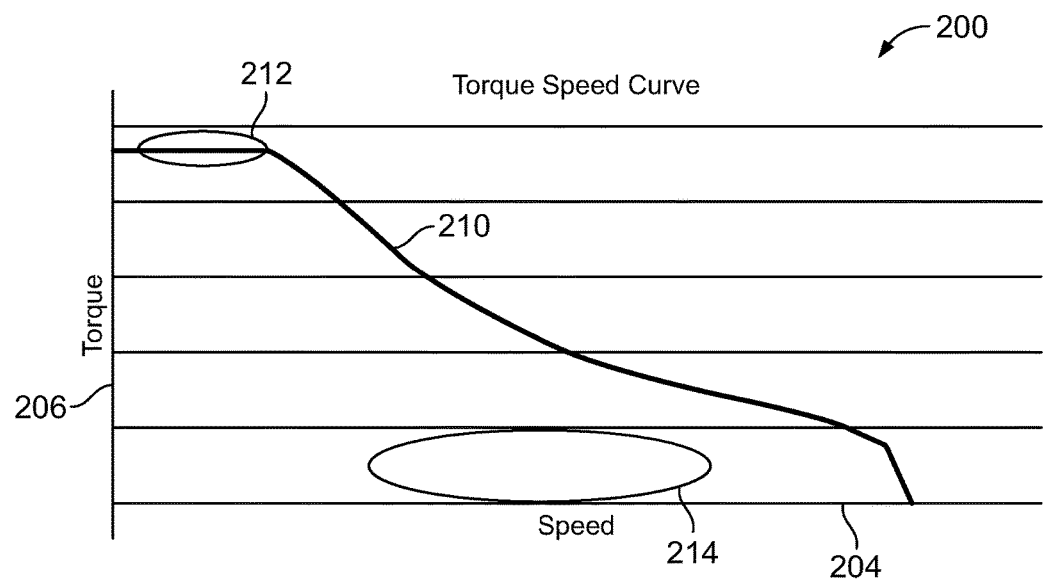
FIG. 3 is a graph showing an example of a torque speed curve for an electric machine.

FIG. 3 shows a graph illustrating an example of a torque speed curve for an electric machine, generally referred to as a graph 200 herein. An X-axis 204 represents a speed of rotor rotation and a Y-axis 206 represents torque for electric machine operation. Torque speed curve 210 represents a typical torque output versus rotor speed for an electric machine. Region 212 represents an area of a high torque performance requirement and region 214 represents an area of low torque drive cycle points. Electric machine function in automotive traction applications may require high torque for performance relative to an amount of torque required to operate through much of EPA efficiency cycles. Permanent magnet motors are often used due to their high efficiency provided by "free" rotor magnetic fields associated with permanent magnets. However, one drawback is that this free rotor magnetic field is always "on" and stator core loss in the electric machine is a function of the magnetic field. For high torque points, a large rotor field is needed to product a large amount of torque with low current. However, for low or zero torque points, a large rotor field may create high stator core loss. Consequently, for electric machines that require high maximum torque and low drive cycle torque, the constant permanent magnet rotor field is typically only optimized for one of the desired conditions.

Figure 4:
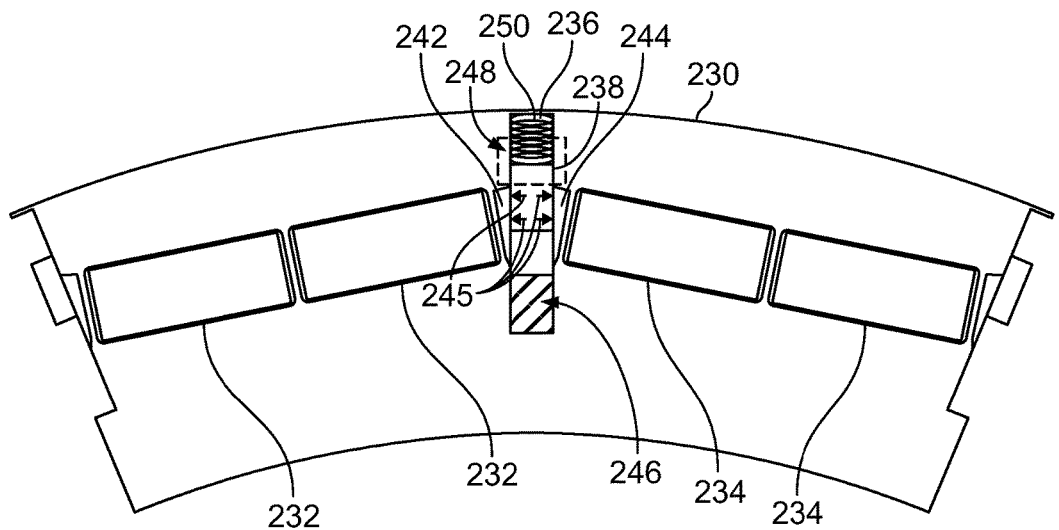
FIG. 4 is a partial front view, in cross-section, of a portion of an example of a rotor for an electric machine.

FIG. 4 is a partial cross-sectional view illustrating an example of a portion of a rotor of an electric machine, referred to as a rotor 230 herein. The electric machine may operate with an electrified vehicle or a vehicle including only an internal combustion engine. The rotor 230 includes an assembly to create a permanent magnet machine with variable rotor flux by using a sliding bridge to create a rotor flux field that varies with rotor 230 rotational speed and a position of a bridge. Creating variable rotor flux provides both high and low torque outputs to accommodate varied torque demands in a vehicle drive cycle. With variable rotor flux, a torque output of a shaft coupled to the rotor 230 may be tuned based on a speed of rotation of the rotor 230. For example, the rotor 230 may include a pair of first magnets 232, a pair of second magnets 234, and a channel 236 disposed between each of the pairs of magnets. Each of the magnets may be, for example, a rare-earth magnet such as a neodymium magnet. The channel 236 may be spaced substantially equidistant from the magnets. A first end of the channel 236 may be spaced from an outer surface of the rotor 230 a distance based on predetermined stress operating parameters of the rotor 230. A bridge 238 may be disposed within the channel 236 for translation between at least first and second positions. For example, a centrifugal force created by rotation of the rotor 230 may influence movement of the bridge 238 within the channel 236. The bridge 238 may be of a soft ferromagnetic material having a high susceptibility to magnetism and high permeability characteristics. Examples of materials for the bridge 238 include silicone steel, iron, cobalt, and ferrite.

By predictably controlling a position of the bridge 238 within the channel 236, shunt flux path thickness may be changed depending on positioning of the bridge 238. A first non-magnetic guide 242 and a second non-magnetic guide 244 may each be disposed on opposing sides of the channel 236 at or near a substantially central channel region. The first non-magnetic guide 242 and the second non-magnetic guide 244 may be of a material having a low friction coefficient and non-magnetic characteristics, such as a polymer. For example, the low friction coefficient may assist in influencing an easier translation of the bridge 238 in comparison to a material of the rotor 230 or other higher friction coefficient materials. The bridge 238 may be positioned in an at rest region 246 when the rotor 230 is at rest. The bridge 238 may slide through a transitional region to an active shunt flux region 248 when the rotor 230 is rotating due to the centrifugal force. The bridge 238 is in a full shunt region when positioned at or near an upper wall of the channel 236. The bridge 238 may be disposed within the channel 236 such that air pockets are defined on either side of the bridge 238. The air pockets may operate as flux barriers to block rotor flux leakage until the bridge 238 is in the active shunt flux region 248.

The first non-magnetic guide 242 and the second non-magnetic guide 244 may assist in blocking magnetic flux leakage traveling in a direction from the bridge 238 toward one of the pairs of magnets, represented by arrows 245. A shape of each of the first non-magnetic guide 242 and the second non-magnetic guide 244 may vary based on an angle or orientation of the magnets mounted to the rotor 230 and located adjacent thereto. For example, each of the non-magnetic guides may include a guide edge substantially parallel with a magnet edge of one of the adjacent magnets of the pair of first magnets 232 or the pair of second magnets 234. In this example, each of the non-magnetic guides are shown having a substantially elongated triangular shape, however it is contemplated that the non-magnetic guides may have other shapes, such as a substantially rectangular shape in an embodiment in which adjacent magnets are oriented to define an edge or plane parallel with a rectangular side of the non-magnetic guides.

Optionally, a spring 250 may be disposed within the channel 236 to bias movement of the bridge 238 in a predictable fashion. For example, the spring 250 may be oriented within the channel 236 to predictably influence centripetal force to oppose the centrifugal force acting on the bridge 238 when the rotor 230 is rotating as mentioned above. Additionally, the spring 250 may operate to retain the bridge 238 in the at rest region 246 when the rotor 230 is not rotating. The spring 250 may be secured to one end of the bridge 238 and to an interior surface of the channel 236. The spring 250 may operate to predictably influence the bridge 238 to be located within the active shunt flux region 248 under certain conditions such as a speed at which the rotor 230 is rotating. The bias of the spring 250 may be tuned based on a size of the rotor, a centrifugal force range based on operating conditions of the rotor 230, and motor torque speed specifications.

Figure 5:
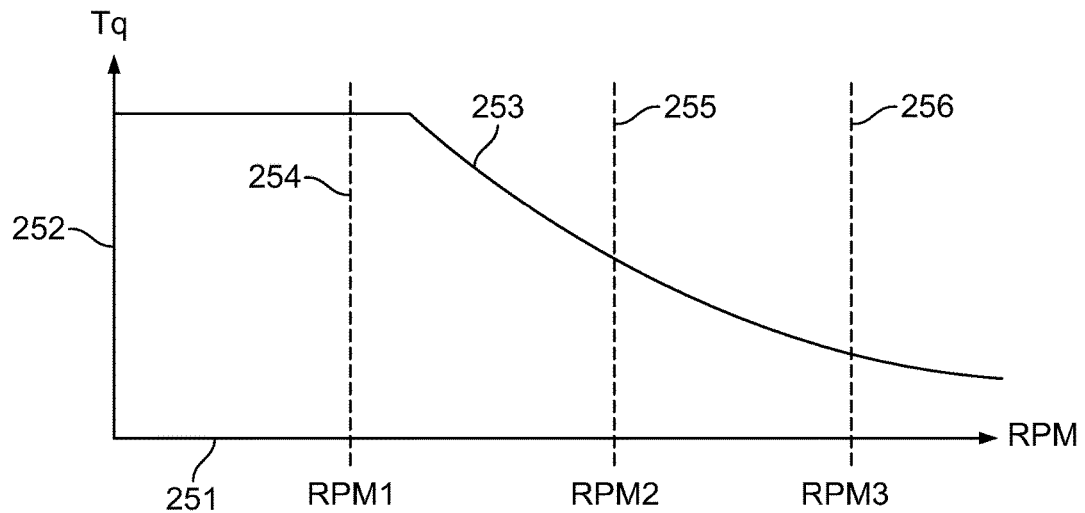
FIG. 5 is a graph showing another example of a torque speed curve for an electric machine.
Figure 6:
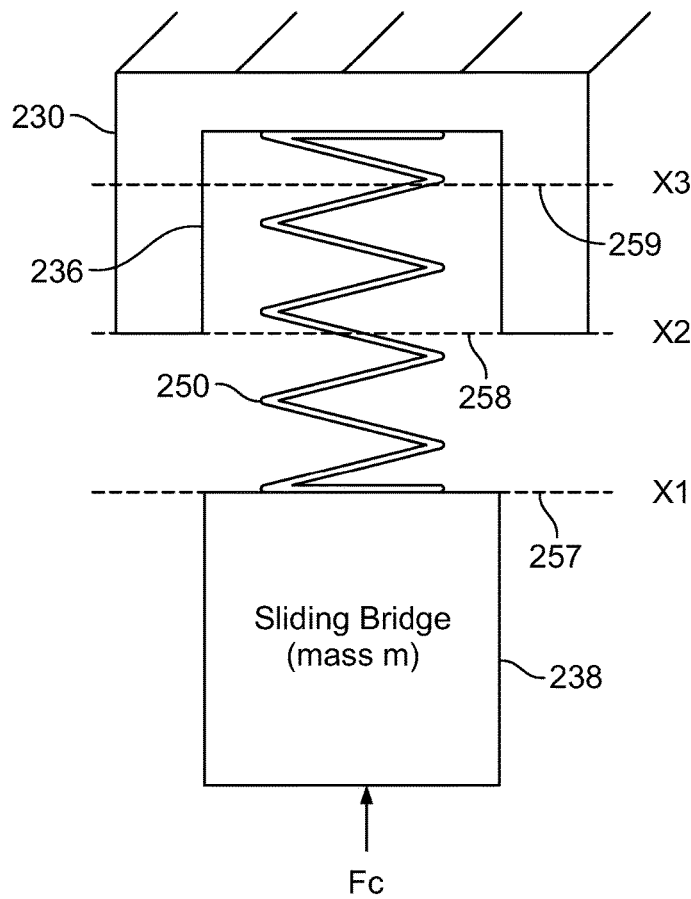
FIG. 6 is a schematic diagram showing an example of a relationship between a spring and sliding bridge of a rotor.

FIGS. 5 and 6 illustrate an example of a mechanical relationship between a spring, bridge, and rotor such as the spring 250, the bridge 238, and the rotor 230. In FIG. 5, an X-axis 251 represents revolutions per minute (RPM) and a Y-axis 252 represents torque. Line 253 represents a torque speed curve. Rotational speed of the rotor is represented at line 254 for RPM1, at line 255 for RPM2, and at line 256 for RPM3. As mentioned above, centrifugal force (represented in FIG. 6 by force arrow $F_c$) created by rotation of the rotor 230 may influence movement of the bridge 238 within the channel 236. The bridge 238 may be in the rest position when the rotor 230 is rotating at RPM1. The bridge 238 may be in between the transition region and the active shunt region when the rotor 230 is rotating at RPM2. The bridge 238 may be in a full shunt position when the rotor 230 is rotating at RPM3.

To influence positioning of the bridge 238 within the channel 236, a spring constant of the spring 250 may be based on a mass of the bridge 238 and desired movement of the bridge 238. FIG. 6 shows a schematic representation of the rotor 230, the bridge 238, and the spring 250. Line 257 at X1 may correspond to the at rest position of the bridge 238. Line 258 at X2 may correspond to a bridge 238 position between the transitional region and the active shunt region. Line 259 at X3 may correspond to the full shunt position of the bridge 238.

A force equation for the spring 250 may be represented by $F_s = kx.$

A force equation for the sliding bridge 238 mass under acceleration may be represented by $F_c = mr\omega^2 = mr\pi RPM^2/30.$ An equation of the system may be represented by $$k = \frac{mr\pi RPM^2}{30x} \text{ or } x = \frac{mr\pi RPM^2}{30k}.$$

To identify a spring constant of the spring 250 and deformation, desired speeds for transitions RPM1, RPM2, and RPM3 are defined based on performance requirements of the rotor 230. X1 may then be selected and k may be solved for at RPM1. Using k, X2 may be solved for at RPM2 and X3 may be solved for at RPM3.

Figure 7A:
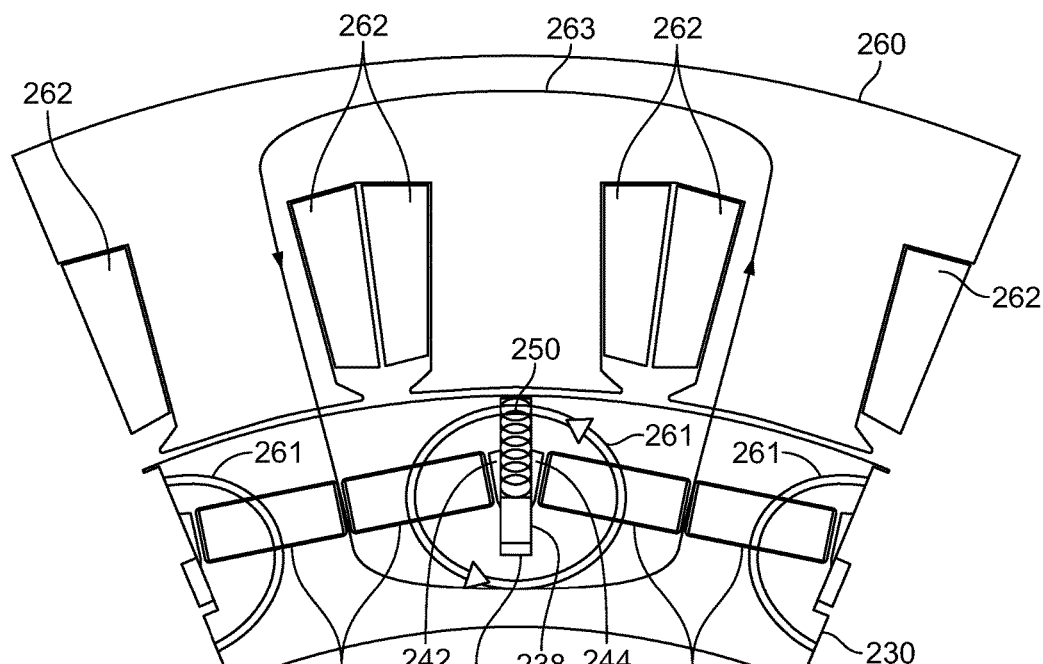
FIG. 7A is a partial front view, in cross-section, of a portion of an example of a rotor and stator for an electric machine showing a bridge in a first position.
Figure 7B:
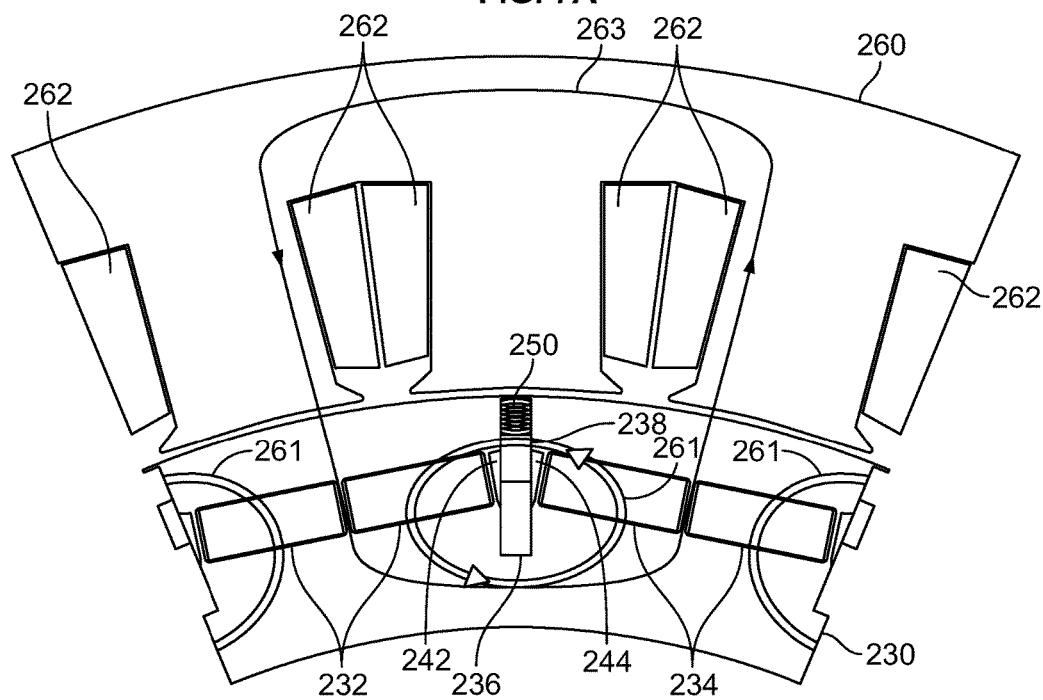
FIG. 7B is a partial front view, in cross-section, of the portion of the example of the rotor and the stator for an electric machine of FIG. 5 showing the bridge in a second position.
Figure 7C:
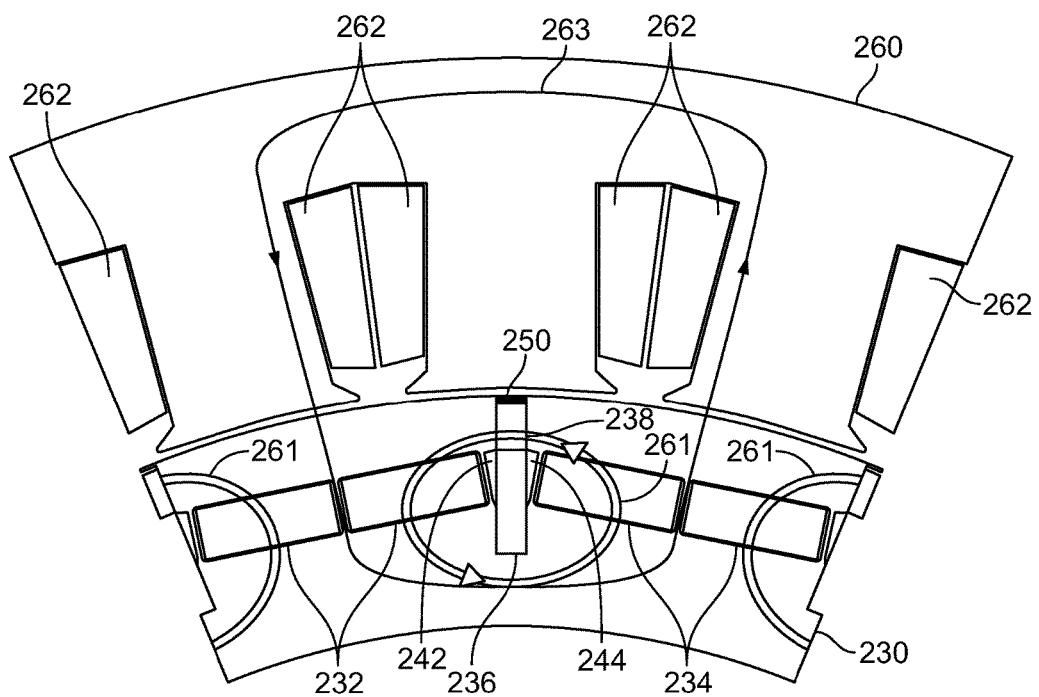
FIG. 7C is a partial front view, in cross-section, of the portion of the example of the rotor and the stator for an electric machine of FIG. 5 showing the bridge in a third position.

FIGS. 7A through 7C illustrate examples of positions for the bridge 238 to generate different magnetic flux paths relative to a stator core 260 having end windings 262. Magnetic shunt flux generated by one of the pair of first magnets 232 and one of the pair of second magnets 234 adjacent to one another is represented by flow path 261. Magnetic flux generated by the stator core 260 is represented by flow path 263. In FIG. 7A, the bridge 238 is shown not engaged with the flow path 261 and in the at rest position in the rest region 246. In this position, the bridge 238 promotes a flow of magnetic flux to the stator core 260. In FIG. 7B, the bridge 238 is shown partially engaged with the flow path 261 in the transition region en route to the active shunt flux region 248. In FIG. 7C, the bridge 238 is shown engaged with the flow path 261 and in the active shunt position in the active shunt flux region 248. In this position, the bridge 238 promotes magnetic flux flow generated by the pair of first magnets 232 and the pair of second magnets 234 to minimize induced voltage and magnetic loss by retaining magnetic flux within the rotor 230 while minimizing interaction with the end windings 262.

Figure 8:
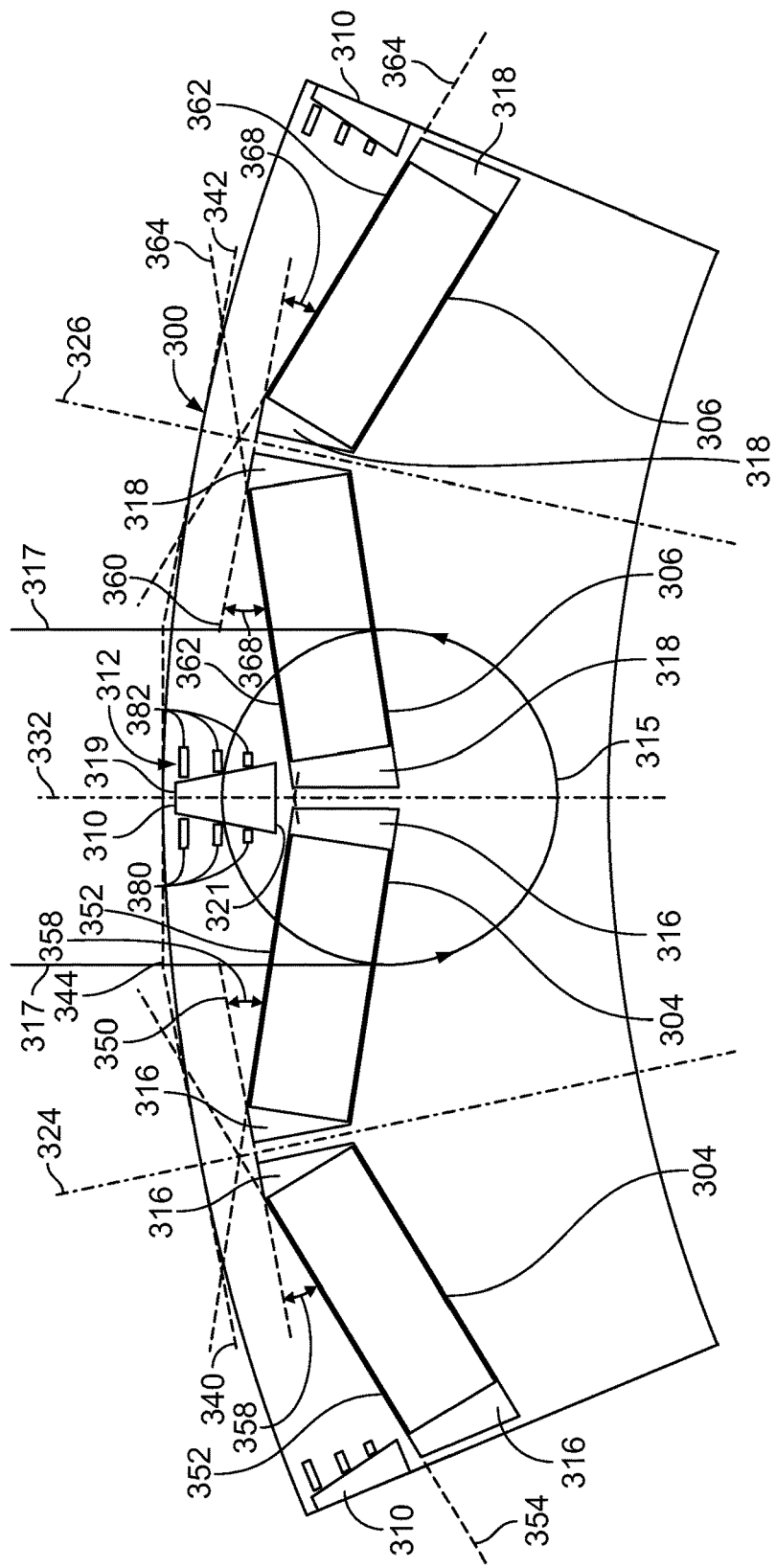
FIG. 8 is a partial front view, in cross-section, of a portion of another example of a rotor for an electric machine showing orientation axes and magnetic flux paths for various electric machine components.
Figure 9:
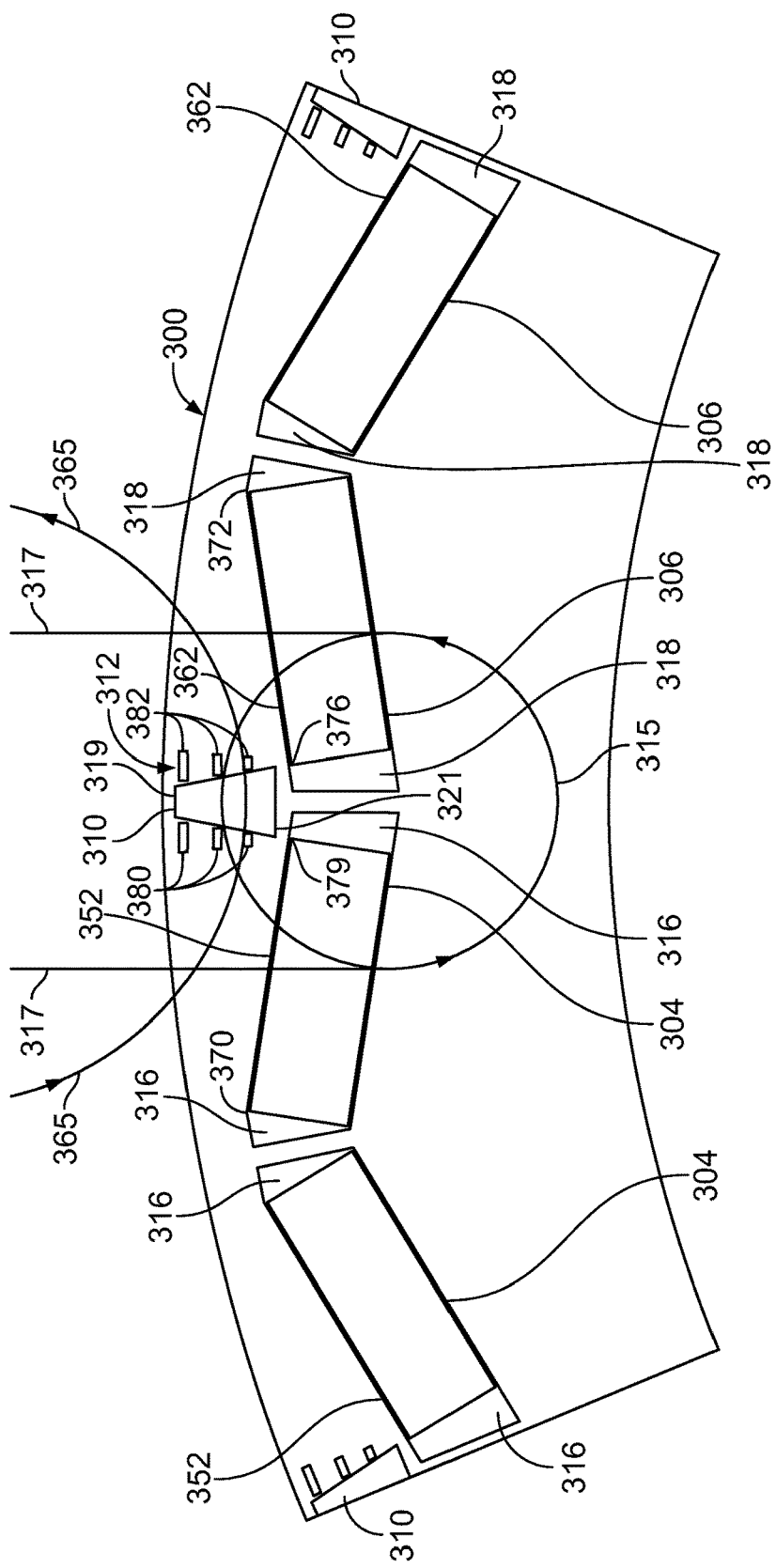
FIG. 9 is a partial front view, in cross-section, of a portion of another example of a rotor for an electric machine showing an example of magnetic flux flow paths influenced by various electric machine components.
Figure 10:
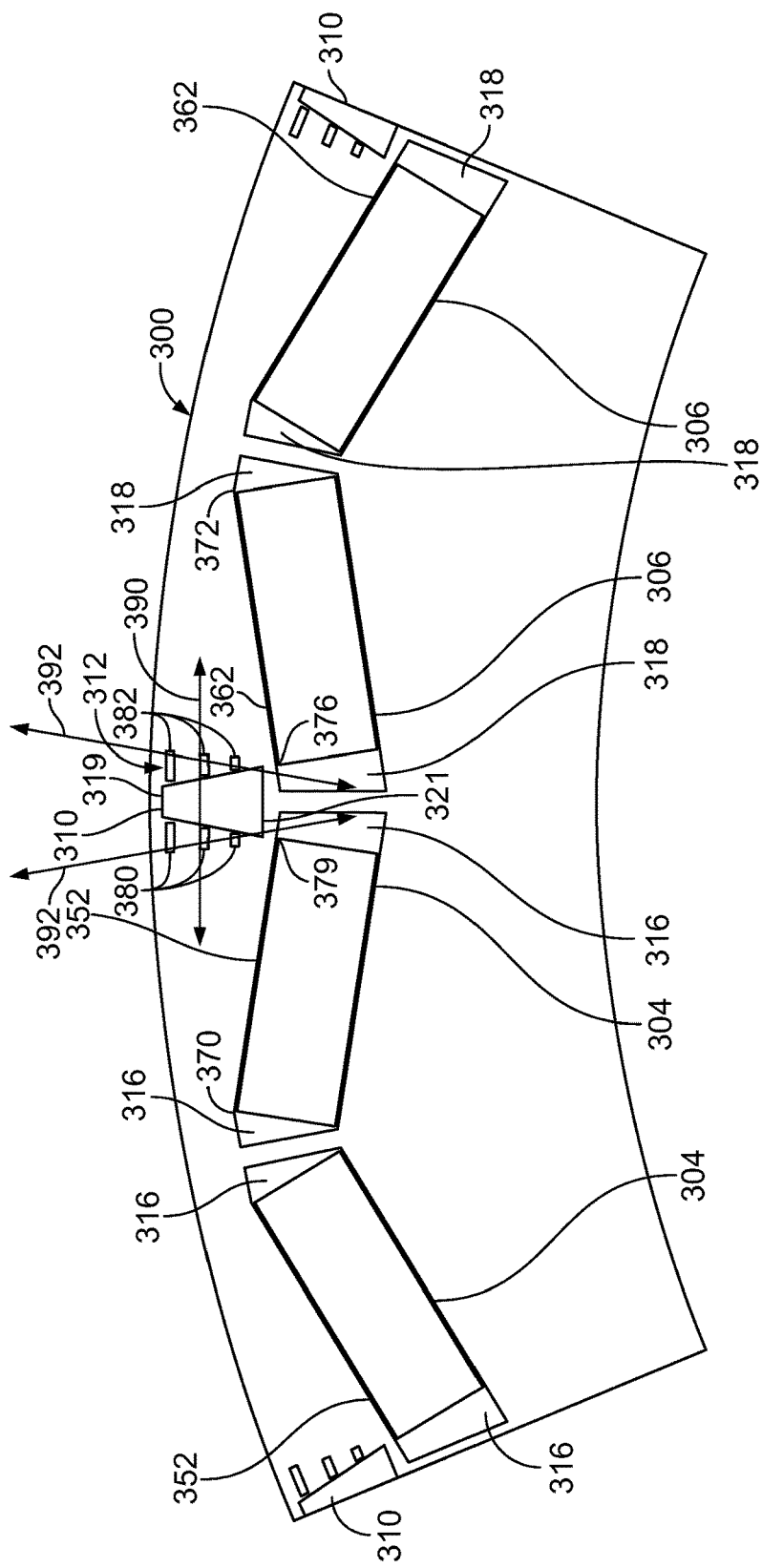
FIG. 10 is a partial front view, in cross-section, of a portion of yet another example of a rotor for an electric machine showing another example of magnetic flux flow paths influenced by various electric machine components.

FIGS. 8 through 10 are partial cross-sectional views illustrating another example of a rotor, generally referred to as a rotor 300 herein. The rotor 300 may operate within an electric machine of an electrified vehicle or a vehicle having only an internal combustion engine. The rotor 300 includes an assembly to create a permanent magnet machine with variable rotor flux. For example, the rotor 300 may include a pair of first magnets 304, a pair of second magnets 306, and a variable flux magnet 310 embedded in a bridge 312. Each of the pair of first magnets 304 and the pair of second magnets 306 may be, for example, a rare-earth magnet such as a neodymium magnet. The variable flux magnet 310 may be, for example, a magnet having lower coercive force properties such as AlNiCo, ferrite, or a low energy rare-earth metal as further described herein. Each of the pair of first magnets 304 may be arranged with one another to form an inverted V. Each of the pair of second magnets 306 may be arranged with one another to form an inverted V. Spaces 316 may be defined by the rotor 300 on either side of each of the pair of first magnets 304 and spaces 318 may be defined by the rotor 300 on either side of each of the magnets the pair of second magnets 306. The spaces 316 and the spaces 318 provide a structure to assist in orienting the pair of first magnets 304 and the pair of second magnets 306 relative to the variable flux magnet 310.

Magnetic shunt flux generated by one of the pair of first magnets 304 and one of the pair of second magnets 306 adjacent to one another is represented by flow path 315. Magnetic flux generated by a stator core (not shown) is represented by flow path 317.

Embedding the variable flux magnet 310 within the bridge 312 assists in shunting magnetic flux when high torque is not needed by preventing excess magnetic flux from reaching the adjacent stator core. Depending on a magnetization state of the variable flux magnet 310, flux from a primary path along a Q-axis from the rotor 300 to a stator may be added, subtracted, or ignored. The variable flux magnet 310 may have characteristics to resist magnetic flux from the primary path while also being controlled with a reasonable D-axis current. For example, AlNiCo is a material which may be used due to lower coercive force characteristics and a higher insensitivity to temperatures. Ferrite or a weaker/thinner rare earth grade material may also be used.

The variable flux magnet 310 may be wedge-shaped to assist in controlling magnetic flux when the rotor 300 is in operation. For example, the variable flux magnet 310 may have a trapezoidal shape in which an outer side 319 has a length less than an inner side 321 as shown in FIG. 8. It is also contemplated that the outer side 319 may have a length greater than the inner side 321 in another assembly example. This trapezoidal shape may assist in providing magnetic flux paths of varied length to control magnetization characteristics as system efficiency may be improved with increased control of interchanging north and south poles of the variable flux magnet 310. For example, thinner paths may require a smaller field to magnetize or demagnetize the variable flux magnet 310 to create a smaller D-axis current. Thicker paths may require a larger field to magnetize or demagnetize the variable flux magnet 310 to create a larger D-axis current. The D-axis current may be pulsed to assist in controlling magnetization of the bridge 312. For example, the D-axis current may be pulsed at a transition between a low torque output to a high torque output (or vice versa) to control bridge magnetization appropriate to an amount of magnetic flux shunting required.

A first D-axis 324 may be defined between the pair of first magnets 304 and spaced equidistant from edges of each of the adjacent spaces 316. A second D-axis 326 may be defined between the pair of first magnets 304 and spaced equidistant from edges of each of adjacent spaces 318. Each of the first D-axis 324 and the second D-axis 326 represent a centerline of a magnetic pole. For example, the pair of first magnets 304 may represent a south pole and the pair of second magnets 306 may represent a north pole. It is contemplated that similar D-axes would be dispersed throughout the rotor 300 in similar locations relative to other adjacent pairs of magnets.

A Q-axis 332 may be defined between one of the pair of first magnets 304 and one of the pair of second magnets 306, spaced equidistant from edges of the space 316 and the space 318 adjacent one another, and disposed between the first D-axis 324 and the second D-axis 326. It is contemplated that similar Q-axes would be dispersed throughout the rotor 300 in similar locations relative to other adjacent magnets. The variable flux magnet 310 may be bisected by the Q-axis 332 or may be offset in either direction from the Q-axis 332. Current flowing along the Q-axis 332 may assist in controlling torque output of the rotor 300.

The first D-axis 324 may be perpendicular to a first tangential axis 340. The first tangential axis 340 may represent a tangent of an outer surface of the rotor 300. The second D-axis may be perpendicular to a second tangential axis 342. The second tangential axis 342 may represent another tangent of the outer surface of the rotor 300. The Q-axis may be perpendicular to a third tangential axis 344. The third tangential axis 344 may represent yet another tangent of the outer surface of the rotor 300.

A first offset axis 350 may be spaced parallel from the first tangential axis 340 and perpendicular to the first D-axis 324. The first offset axis 350 may intersect with a corner of each of the pair of first magnets 304. Each of the pair of first magnets 304 may include an edge 352 defining a first edge axis 354. Each of the first edge axes 354 may be arranged relative to the first offset axis 350 at an angle between zero and ninety degrees, represented by angle 358. In one example, each of the first edge axes 354 is arranged at a thirty-degree angle relative to the first offset axis 350.

A second offset axis 360 may be spaced parallel from the second tangential axis 342 and perpendicular to the second D-axis 326. The second offset axis 360 may intersect with a corner of each of the pair of second magnets 306. Each of the pair of second magnets 306 may include an edge 362 defining a second edge axis 364. Each of the second edge axes 364 may be arranged relative to the second offset axis 360 at an angle between zero and ninety degrees, represented by angle 368. In one example, each of the second edge axes 364 is arranged at a thirty-degree angle relative to the second offset axis 360.

Each of the inverted V shapes defined by the pair of first magnets 304 and the pair of second magnets 306 assist in focusing D-axis flux into the variable flux magnet 310 to allow a magnification of the D-axis current effect on magnetization. In FIG. 9, each of the pair of first magnets 304 and the pair of second magnets 306 are arranged to not interfere with magnetic flux generated by the stator core and represented by flow path 365. This arrangement assists in directing the flow path 365 into the variable flux magnet 310.

Various orientations of each of the pair of first magnets 304 and the pair of second magnets 306 are available to arrange the magnets to assist in directing the flow path 365 into the variable flux magnet 310. For example, an upper outer corner 370 of one of the pair of first magnets 304 and an upper outer corner 372 of one of the pair of second magnets 306 may be spaced from the outer surface of the rotor 300 at a distance based on predetermined stress operating parameters of the rotor 300. An upper inner corner 374 of one of the pair of first magnets 304 and an upper inner corner 376 of one of the pair of second magnets 306 may be spaced from the outer surface of the rotor 300 at a distance based on predetermined stress operating parameters of the rotor 300.

Each of a first side flux barrier 380 and a second side flux barrier 382 may be mounted to the rotor 300 on opposing sides of the variable flux magnet 310. The first side flux barrier 380 and the second side flux barrier 382 may assist in preventing Q-axis current or flux from influencing a magnetization state of the variable flux magnet 310. For example, the first side flux barrier 380 and the second side flux barrier 382 may influence magnetic flux flowing through the variable flux magnet 310 to be substantially horizontal (as represented by flow path 390 in FIG. 10) in comparison to substantially vertical (as represented by flow paths 392 in FIG. 10). The first side flux barrier 380 and the second side flux barrier 382 may also provide a measure of separation from D-axis flux from the stator and D-axis flux from the first pair of first magnets 304 and the second pair of second magnets 306 to assist in facilitating better magnetization control of the variable flux magnet 310. While in this example the first side flux barrier 380 and the second side flux barrier 382 are shown having three barriers of a substantially straight shape, it is contemplated that a greater number of barriers may be utilized having a curved shape.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine assembly for an electrified vehicle comprising:
   a stator core defining a cavity;
   a rotor disposed within the cavity for rotation and including a bridge;
   a first pair of magnets mounted to the rotor and spaced from one another on either side of a first D-axis;
   a second pair of magnets mounted to the rotor and spaced from one another on either side of a second D-axis, wherein the first D-axis and the second D-axis are spaced from one another on either side of a Q-axis; and
   a variable flux magnet embedded in the bridge and located on the rotor to influence current associated with the Q-axis to control torque output of the rotor, and to pulse D-axis current to control a magnetization of the bridge.

2. The assembly of claim 1, wherein the magnets of the first pair of magnets or the second pair of magnets are arranged with one another to define an inverted V shape.

3. The assembly of claim 1 further comprising a first side flux barrier disposed on a first side of the variable flux magnet and a second side flux barrier disposed on a second side of the variable flux magnet, wherein the side flux barriers are arranged with the variable flux magnet to prevent vertical current or flux associated with the Q-axis from influencing magnetization of the variable flux magnet.

4. The assembly of claim 3, wherein the first side flux barrier and the second side flux barrier are each located to influence magnetic flux to flow in a substantially horizontal path through the variable flux magnet.

5. The assembly of claim 1, wherein the variable flux magnet is one of AlNiCo, ferrite, and a low energy rare-earth metal.

6. The assembly of claim 1, wherein the variable flux magnet is arranged with the first pair of magnets and the second pair of magnets such that magnetic flux associated with the Q-axis is diverted about the variable flux magnet to control the rotor torque output.

7. An electric machine assembly for an electrified vehicle comprising:
   a stator core defining a cavity;
   a rotor disposed within the cavity and including a bridge;
   a first pair of magnets each arranged with one another to generate current along a first D-axis when the rotor is rotating and the stator core is activated;
   a second pair of magnets each arranged with one another to generate current along a second D-axis when the rotor is rotating and the stator core is activated; and
   a trapezoidal-shaped variable flux magnet embedded in the bridge and arranged with the first and second pairs of magnets such that current associated with a Q-axis bisecting the variable flux magnet travels in a substantially horizontal path through the variable flux magnet.

8. The assembly of claim 7, wherein the variable flux magnet includes a first side and a second side, and wherein the first side is closer to an outer surface of the rotor and has a shorter length than a length of the second side.

9. The assembly of claim 7, wherein the trapezoidal shape of the variable flux magnet creates a first path and a second path thicker than the first path to influence magnetic flux to travel along the substantially horizontal path.

10. The assembly of claim 7 further comprising a first side flux barrier and a second side flux barrier each disposed on opposing sides of the variable flux magnet to block or minimize magnetic flux traveling in a substantially vertical flow path.

11. An electric machine assembly comprising:
    a rotor disposed within a stator core and including a bridge;
    a variable flux magnet embedded in the bridge; and
    first and second magnets arranged to define a D-axis therebetween and to define an inverted slope to focus magnetic flux associated with the D-axis into the variable flux magnet and increase a current effect associated with the D-axis on magnetization of the variable flux magnet.

12. The assembly of claim 11 further comprising a tangent axis defined by an outer surface of the rotor and an offset axis spaced parallel from the tangent axis, wherein one of the magnets defines an edge axis, and wherein an angle of the edge axis relative to the offset axis is selected to affect an amount of magnetic flux associated with the D-axis transferred into the variable flux magnet to influence a magnetization of the variable flux magnet.

13. The assembly of claim 12, wherein the angle of the edge axis relative to the offset axis is between twenty-five and thirty-five degrees.

14. The assembly of claim 12, wherein the angle of the edge axis relative to the offset axis is approximately thirty degrees.

15. The assembly of claim 12, wherein the first magnet and the second magnet are arranged with one another to form an inverted V.

16. The assembly of claim 11 further comprising a first side flux barrier and a second side flux barrier each disposed on one of opposing sides of the variable flux magnet to retain flux of the variable flux magnet therebetween.

* * * * *